United States Patent
Krause et al.

(10) Patent No.: US 7,992,694 B2
(45) Date of Patent: Aug. 9, 2011

(54) SEAL FOR TORQUE CONVERTER LOCKUP CLUTCH

(75) Inventors: Thorsten Krause, Buehl (DE); Dominique Engelmann, Offendorf (FR)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 672 days.

(21) Appl. No.: 11/794,031

(22) PCT Filed: Dec. 14, 2005

(86) PCT No.: PCT/DE2005/002251
§ 371 (c)(1),
(2), (4) Date: Jun. 22, 2007

(87) PCT Pub. No.: WO2006/066547
PCT Pub. Date: Jun. 29, 2006

(65) Prior Publication Data
US 2008/0008591 A1 Jan. 10, 2008

(30) Foreign Application Priority Data
Dec. 24, 2004 (DE) .......................... 10 2004 062 608

(51) Int. Cl.
*F16H 45/02* (2006.01)
(52) U.S. Cl. ..................... 192/3.29; 192/85.44; 277/300
(58) Field of Classification Search ................. 277/448, 277/581; 192/85.44
See application file for complete search history.

(56) References Cited

U.S. PATENT DOCUMENTS

| | | | |
|---|---|---|---|
| 2,647,810 A * | 8/1953 | McCuistion | 277/448 |
| 3,052,476 A * | 9/1962 | Workman | 277/448 |
| 3,366,392 A * | 1/1968 | Kennel | 277/448 |
| 3,612,545 A * | 10/1971 | Storms | 277/448 |
| 3,887,198 A | 6/1975 | McClure et al. | |
| 4,473,145 A * | 9/1984 | Bopp | 192/3.29 |
| 5,934,680 A * | 8/1999 | Kakehi et al. | 277/499 |
| 6,105,970 A * | 8/2000 | Siegrist et al. | 277/448 |
| 6,129,358 A * | 10/2000 | Kiesel et al. | 277/448 |
| 6,155,392 A * | 12/2000 | Kundermann | 192/3.3 |
| 6,173,965 B1 * | 1/2001 | Niessen | 277/448 |
| 6,588,763 B1 | 7/2003 | Jones et al. | |
| 7,066,312 B2 * | 6/2006 | Abe et al. | 192/3.29 |
| 2003/0102633 A1 * | 6/2003 | Abiko | 277/529 |
| 2003/0102663 A1 | 6/2003 | Chu | |
| 2004/0188208 A1 | 9/2004 | Leber | |

FOREIGN PATENT DOCUMENTS

| | | |
|---|---|---|
| DE | 33 31 673 A1 | 3/1985 |
| DE | 44 12 927 A1 | 10/1995 |
| DE | 103 14 338 A1 | 10/2004 |
| EP | 1 277 995 A1 | 1/2003 |
| EP | 1 331 414 A2 | 7/2003 |
| FR | 2 185 062 | 12/1973 |

* cited by examiner

*Primary Examiner* — Rodney H Bonck
(74) *Attorney, Agent, or Firm* — Davidson, Davidson & Kappel, LLC

(57) ABSTRACT

A method and a sealing system for sealing the space between a piston and the hub of a torque converter lockup clutch is provided. According to the method and the sealing system, the seal is pretensioned with its cylindrical surface facing the piston bore. In an embodiment of the invention, the first seal is fastened by a second seal. The invention allows minimization of oil leakage flow and at the same time to linearize its dependency on the differential pressure. Spontaneous sealing may be reduced, thereby directly correlating the contact pressure of the piston—and thus the torque of the torque converter lockup clutch—with differential pressure and eventually allowing for smoother travel.

17 Claims, 5 Drawing Sheets

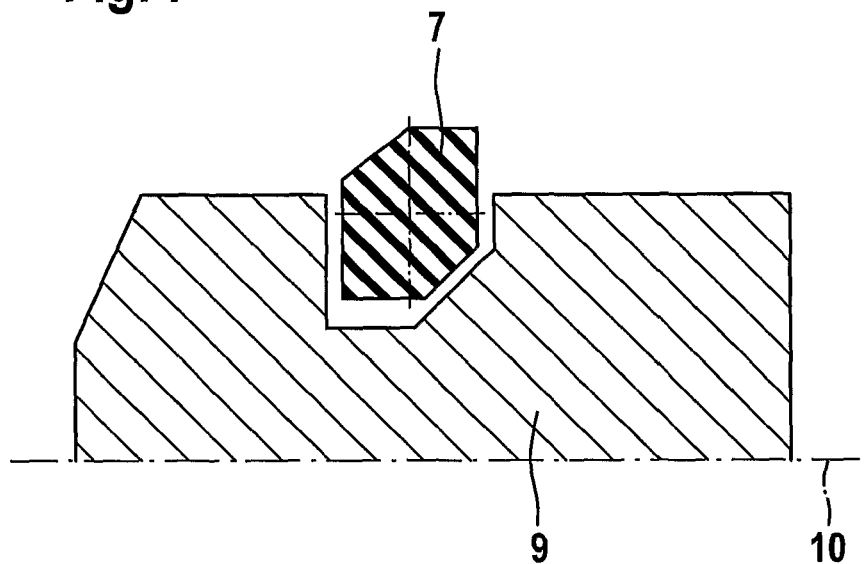
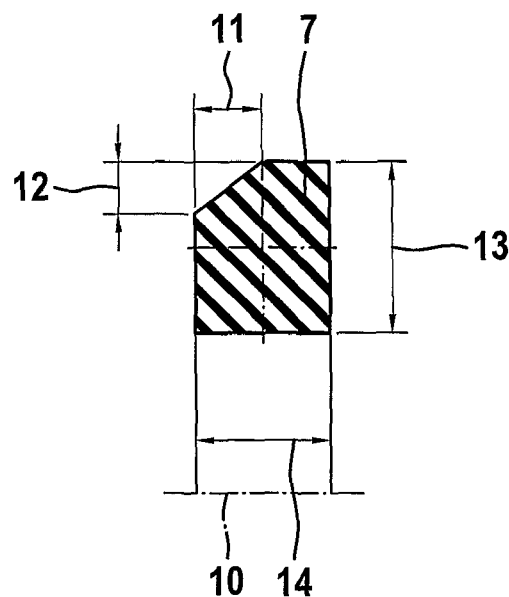 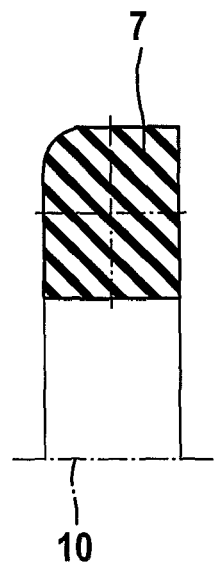 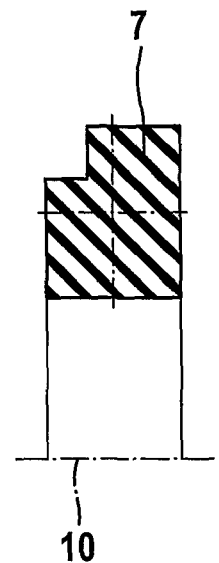

SEAL FOR TORQUE CONVERTER LOCKUP CLUTCH

The invention relates to a method and a sealing system for sealing between the piston of a torque converter lockup clutch and a hub in a hydrodynamic clutch, particularly in a torque converter.

BACKGROUND

In state of the art torque converters, a torque converter lockup clutch is disposed, which is engaged when small rotation speed differences between the pump and the turbine are present, in order to improve the efficiency of the torque converter. When the torque converter lockup clutch is actuated through oil pressure, a friction locked connection between the torque converter housing and the hub, into which the transmission input shaft of the subsequent transmission engages, is established. In the force flow between the torque converter housing and the hub, a torsion oscillation damper can be located in addition.

The piston of the torque converter lockup clutch has a bore in its center, through which it can be concentrically located on a hub. This hub can be a turbine hub, as well as another hub. It is only important in this context, that the piston can be moved in an axial direction as easily as possible, so that the friction moment between the piston and the torque converter housing can be adjusted as sensitively as possible. In order to move the piston in an axial direction, a differential oil pressure is built up on both sides of the piston, so that an axial force component is generated. A pressure loading is most common, in which a higher pressure prevails in the section between the piston and the torque converter turbine, than in the section between the piston and the engine side torque converter housing.

Through the axial movability of the piston on the hub, an oil leakage flow is possible here, therefore, according to the state of the art, a seal is located between the bore of the piston and the hub associated with it. Thus optimum sealing at this location is difficult, since, on the one hand, an axial movability of the piston has to be assured, which is as smooth as possible, and, on the other hand, the leakage oil flow has to be kept as small as possible. In addition, there is the problem that different speeds of rotation between the piston and the hub exist, depending on the operating situation of the torque converter, through which the relative rotational movement between the piston and the hub are present. Only when the torque converter lockup clutch is completely locked, no relative rotational movements occur.

When accelerating from a stop, the relative speeds of rotation between the piston and the hub are in the range of 600 to 2,500 RPM; in the general driving range the relative speeds of rotation are still in the range of 10 to 60 RPM. This means, that the seal also has to be durable under relative rotation besides its primary sealing function, since this component cannot be replaced due to the enclosed shape of the torque converter.

In order to assure a comfortable control of the torque converter lockup clutch under low torque, in particular during coasting, it is necessary that the seal already seals under very low differential pressures on both sides of the piston (<0.1 bar). If this is not the case, a leakage occurs at the gasket, which is spontaneously reduced in an excursive, thus unpredictable, manner, when the pressure increases further. Due to the substantially constant characteristic pump curve of the oil feed pump, the spontaneous sealing between the piston and the hub causes a step in the differential pressure between the two outside piston surfaces, whereby also a spontaneous stronger pressing of the piston is performed, whereby in turn an increased friction moment is generated. This step in the friction moment leads to a jolt, which is perceived by the driver of the vehicle as uncomfortable.

SUMMARY OF THE INVENTION

Therefore, it is an object of the invention to at least reduce the spontaneous sealing at the seal between the piston and the hub. According to the invention, the spontaneous sealing may be reduced through a method, in which the seal is pressed against the surface of the piston bore through a preload. This preload is accomplished by the seal ring being oversized at its outer diameter; therefore, it rotates substantially at the speed of the piston. Thus a relative rotation only occurs between the seal and the groove for the seal in the hub.

Furthermore, the object may also be accomplished through building a seal system, in which the seal abuts to the bore of the piston with a substantially cylindrical surface, while being provided endless (cylindrical in this context means that the curvature radius is smaller or equal to the outer diameter of the seal). In the state of the art, it may be disadvantageous that the seals are not closed and, thereby, have a straight or diagonal joint. This increasingly leads to a spontaneous sealing, in particular in connection with axial motions and/or relative motions between piston and hub.

BRIEF DESCRIPTION OF THE DRAWINGS

Subsequently, the invention shall be described in more detail with reference to the figures.

These show in.

DETAILED DESCRIPTION

Figure 1:
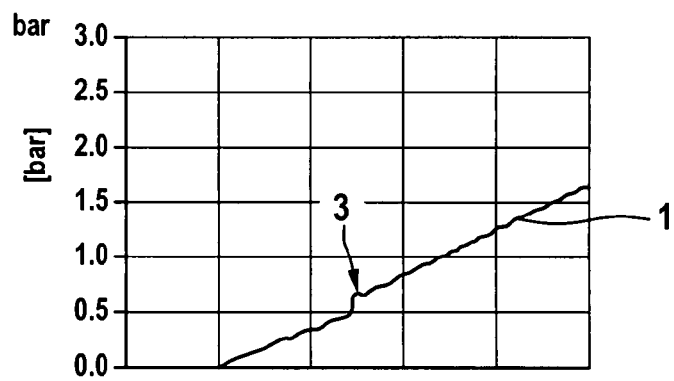
FIG. 1 a diagram of the differential pressure over the piston stroke according to the state of the art, FIG. 2 a diagram of the leakage oil flow over the piston stroke according to the state of the art, FIG. 3 a diagram of the differential pressure over the piston stroke according to the present invention, FIG. 4 a diagram of the leakage oil flow over the piston stroke according to the invention, FIG. 5 a schematic cut through a piston and a hub with the seal system according to the invention, FIG. 6 like FIG. 5, but with a beveled seal, FIG. 7 like FIG. 5, but with a seal beveled on both sides, FIGS. 8-10 further embodiments of the seal shape, FIG. 11 like FIG. 5, but with an additional radial O-ring, FIG. 12 like FIG. 5, but with an additional O-ring in axial direction, FIG. 13 a seal system similar to FIG. 11.
Figure 2:
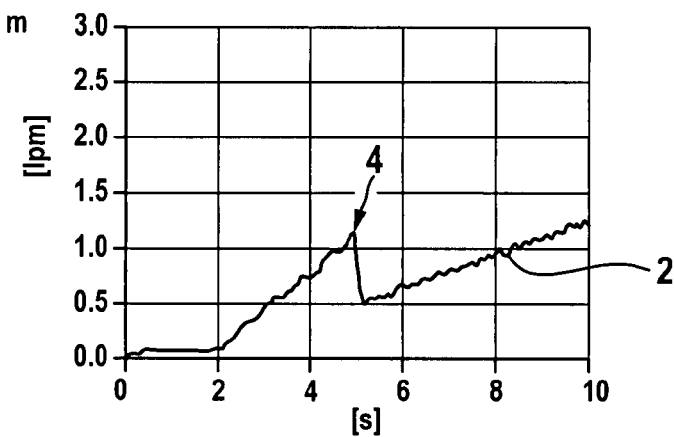
Figure 3:
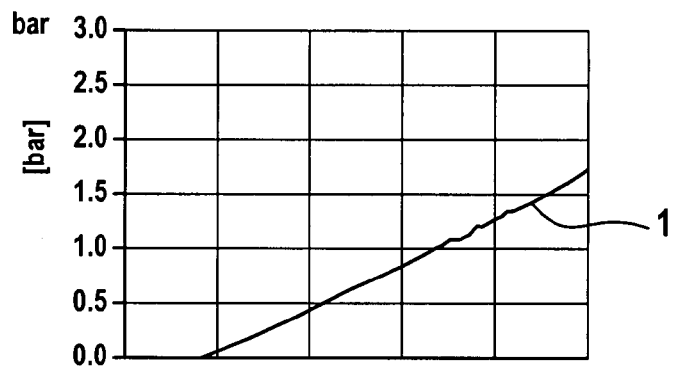
Figure 4:
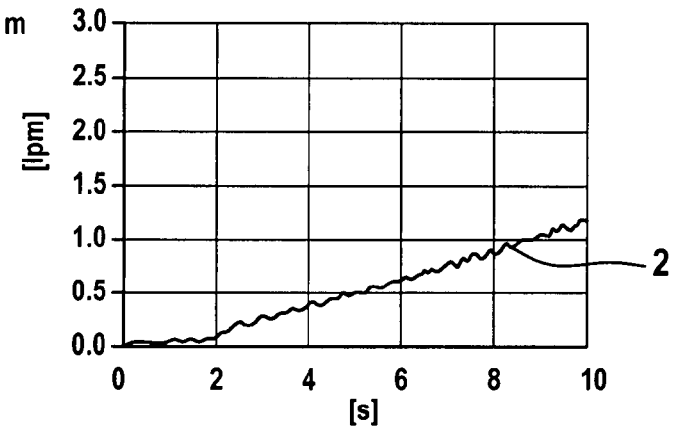

The FIGS. 1 and 2 or the FIGS. 3 and 4 each have to be viewed respectively in a general perspective. The FIGS. 1 and 2, hereby, show the problem of spontaneous sealing, while the FIGS. 3 and 4 illustrate the sealing properties according to the invention.

In FIG. 1, the characteristic curve 1 can be seen, which illustrates the differential pressure on the piston over the piston stroke s. Approximately at the piston stroke s=5, the characteristic curve of the differential pressure increases above a value of 0.5 bar.

In FIG. 2, the associated characteristic curve 2 of the oil leakage over the piston stroke is shown. Here it can be seen clearly that at the piston stroke s=5 the leakage (in liters per minute) suddenly drops from the value of approximately 1.2 to the value of 0.5. This is the section 4 of spontaneous sealing, which is expressed as the pressure step 3 in the diagram of FIG. 1. Together with the higher differential pressure onto the piston comes a higher moment of friction of the torque converter lockup clutch, whereby overall an increased moment is transferred from the engine to the transmission. The jolt resulting there from during driving degrades the driving comfort. It would be disadvantageous in particular, if during driving also spontaneous leakage increases would be possible with a subsequent transition into spontaneous sealing. Through this a recurring jolt during acceleration and deceleration would be felt.

In the diagrams of the FIGS. 3 and 4 in the area of the piston travel from the value s=2 to s=10, a substantially linear behavior is shown, through which a substantially proportional moment of friction is possible at the torque converter lockup clutch, through controlled or regulated differential pressure increase at the piston.

Figure 5:
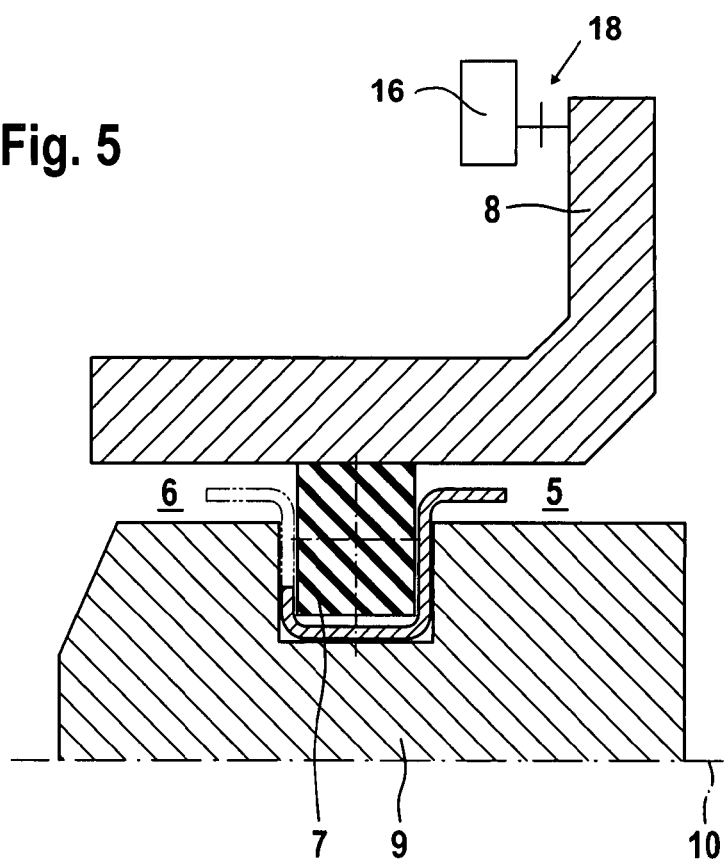

FIG. 5 shows a schematic cut through torque converter housing 16, a piston 8 of a torque converter lockup clutch 18 and a hub 9. Herein, it can be clearly seen that the seal 7, according to the invention, abuts to the bore of the piston 8, while the seal 7 has clearance in the groove of the hub 9 (for reasons of clarity, this clearance is depicted in an exaggerated manner). Through a middle line or rotation axis 10, it shall be indicated that the hub 9, the piston 8, and the seal 7 are disposed concentric relative to each other. In a section 5 a higher oil pressure prevails than in a section 6, through which a defined leakage around the seal 7 occurs towards the lower oil pressure. In an advantageous manner, an additional pressing of the seal 7 against the piston 8 is effectuated by the oil pressure onto the interior diameter of the seal 7, whereby an additional preload of the seal 7 against the piston 8 is performed. Independent from that, a preload is already in effect through the sizing of the outer diameter of the seal 7 or the sizing of the inner diameter of the piston 8, when the piston 8 is slid over the seal 7 when mounting the torque converter.

The gap shown in FIG. 5 between the seal 7 and the hub 9, though shown in an exaggerated manner, however, it is usefull, according to the invention, to provide a gap in this location, since, thereby, the fixation of the seal 7 relative to the piston 8 becomes definite. The leakage oil flow through the slot between the seal 7 and the hub 9 from the area of the higher pressure 5 to the area 6 of the lower pressure constitutes a detour path, through which eventually a reliable non spontaneous sealing is possible.

Figure 6:
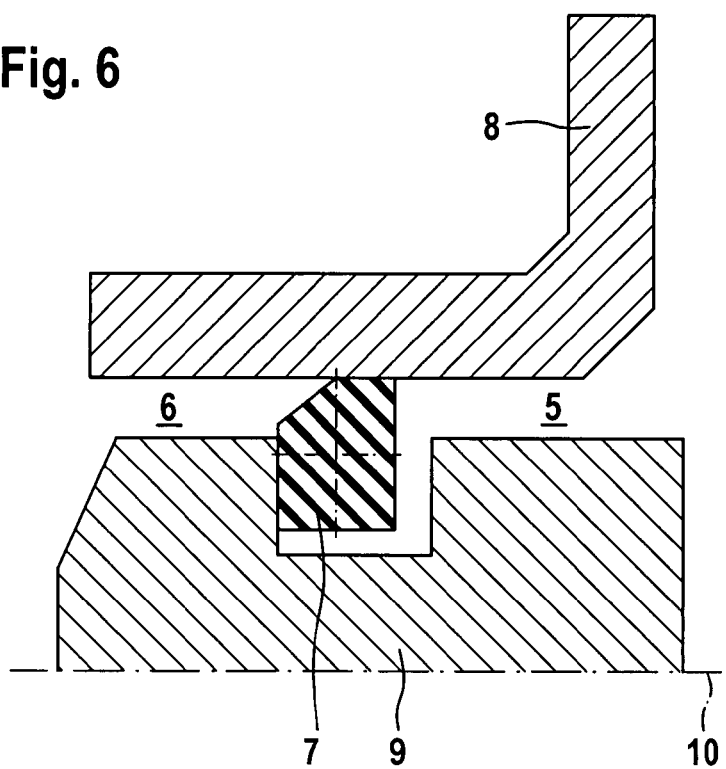

In the FIG. 6, the seal 7 is provided with a bevel, which preferably faces the area 6, which has a lower pressure. It has become evident that the bevel also contributes to making the leakage substantially proportional to the pressure differential.

In the FIGS. 8 to 10, further embodiments of the seal 7 are shown. Preferably, the bevel height 12 should only amount to 50% of the ring height 13. Preferably, also the bevel width 11 should only be 50% of the ring width 14. Instead of a bevel a radius can also be provided in the area of the seal 7, as shown in FIG. 9, which faces the pressure area 6. A bevel and a radius furthermore have the advantage, that they constitute an insertion aide when sliding the piston 8 over. In the embodiment, according to FIG. 10, the seal 7 is provided with a shoulder, wherein this also provides the said advantages of a bevel. In special cases, it can also be necessary that the bevel or the shoulder are also located at the side of the seal 7, where the area 5 of the higher pressure is located. Also a location of bevel, radius and shoulder on both sides can be possible, wherein also a combination of various forms of rims can be selected.

In FIG. 7, an embodiment of the seal 7 is shown, which is also provided with a bevel at its interior diameter. This has the advantage that the seal 7 cannot be mounted onto the hub 9 the wrong way, whereby the bevel shown on the left side would then be located on the other side.

In this context it should be mentioned that the above also applies accordingly, when the seal groove is not located in the hub 9 but in the piston 8.

Figure 11:
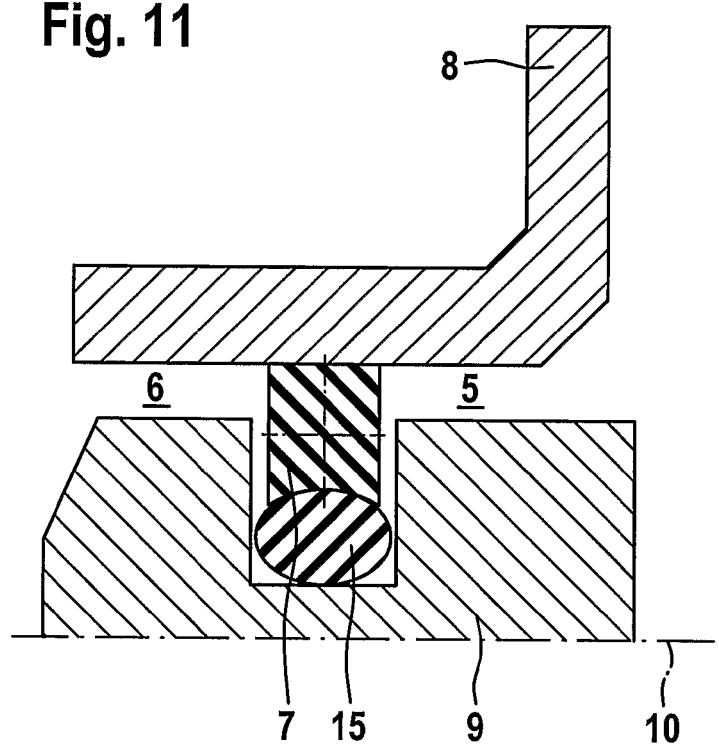
Figure 12:
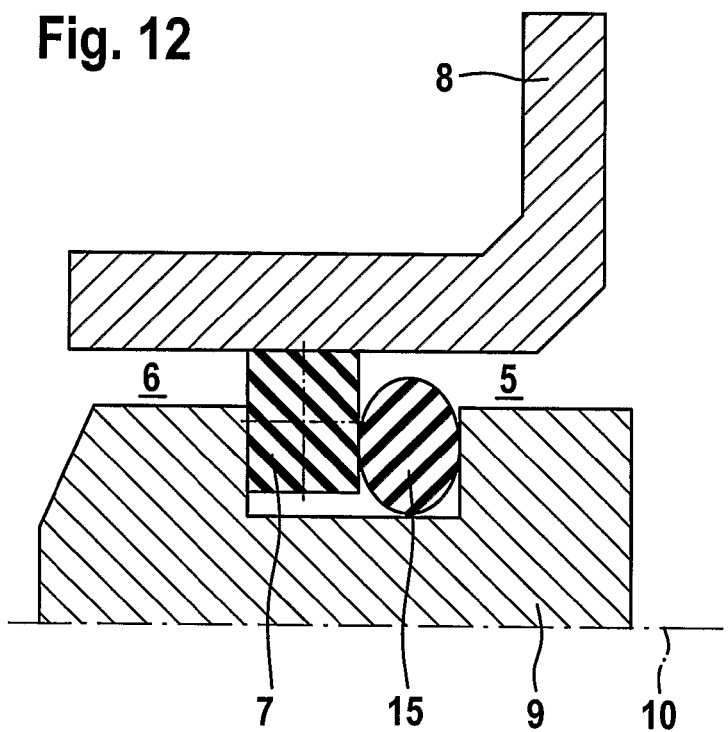
Figure 13:
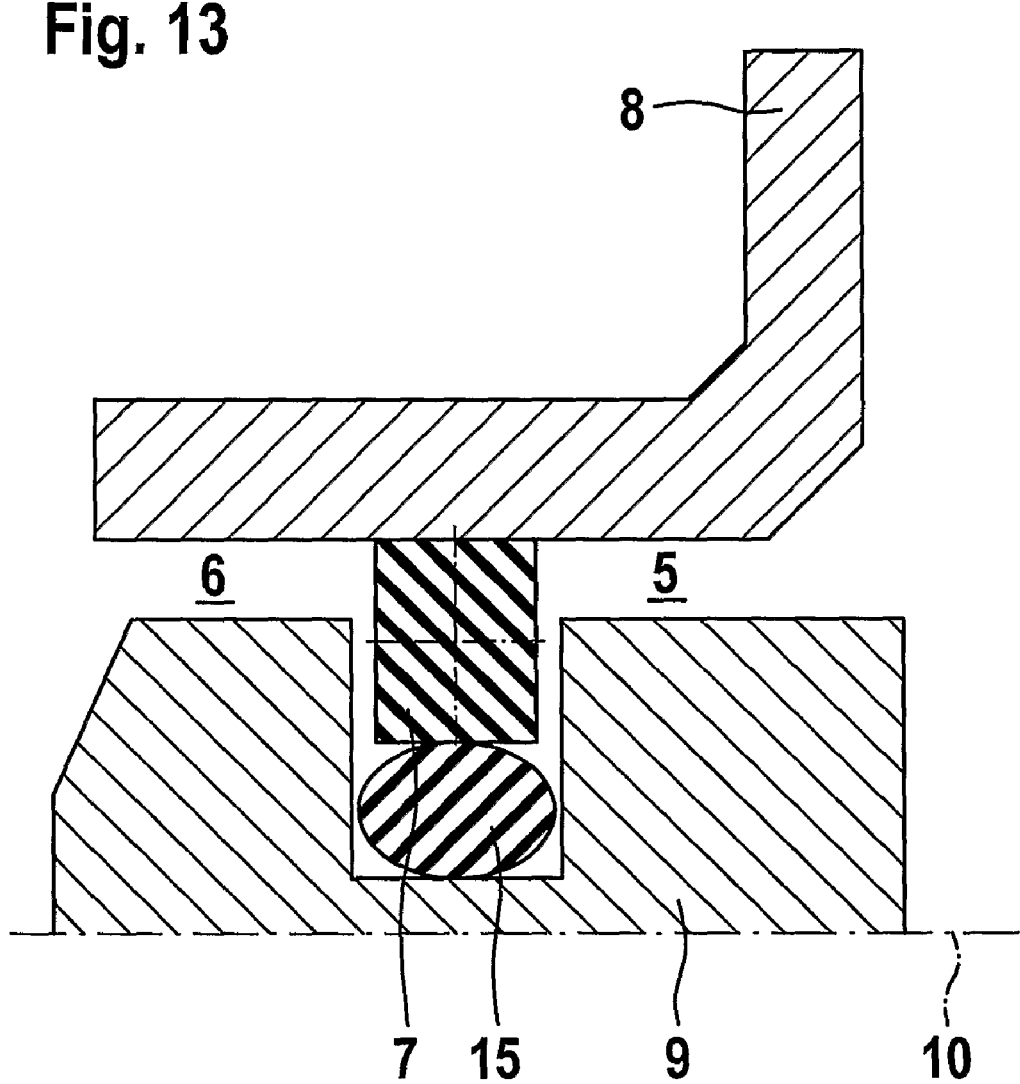

The FIGS. 11 to 13 have in common that in addition to the seal 7 also an O-ring 15 is being used. In the FIGS. 11 and 13, this O-ring 15 is located radially inside the seal 7, while the O-ring 15 in FIG. 12 is located axially next to the seal 7. The FIGS. 11 to 13, furthermore have in common, that in connection with the O-ring 15 an absolute sealing is possible at lower differential pressures. The difference between FIG. 11 and FIG. 13 is that in FIG. 11 the seal ring 7 is provided with a fillet, whereby the O-ring 15 abuts to the interior diameter of the seal 7 in a substantially flat manner.

Also in connection with the FIGS. 11 to 13, it is conceivable that the seal 7 is provided with a bevel, radius or a shoulder (or groove) as described above.

REFERENCE NUMERALS

1 Characteristic curve, differential pressure over piston stroke
2 Characteristic curve, oil leakage over piston stroke
3 Pressure step
4 Area of spontaneous sealing
5 Area of higher pressure
6 Area of lower pressure
7 Seal according to the invention
8 Piston of torque converter lockup clutch
9 Hub
10 Center line/rotation axis
11 Bevel width
12 Bevel height
13 Ring height
14 Ring width
15 O-ring

What is claimed is:

1. A method for sealing in a torque converter with a torque converter lockup clutch, a hub, and a piston located on the hub and having a concentric bore, the hub being located in the concentric bore; the method comprising:
    sealing the concentric bore with respect to the piston using at least one seal, such that the sealing is preloaded against the bore and the seal sealing a high pressure side from a low pressure side, and
    permitting leakage to flow in a leakage slot, the leakage flowing from the high pressure side to the low pressure side, the leakage slot being located between the seal and the hub.

2. A torque converter having a torque converter lockup clutch, the torque converter comprising:
    a hub;
    a piston of the torque converter lockup clutch, the piston having a concentric bore, the hub being located in the concentric bore; and
    at least one seal sealing the concentric bore with respect to the piston, the seal being preloaded against the bore, the seal located between the hub and the concentric bore, the seal sealing a high pressure side from a low pressure side, a leakage flow slot being located between the seal and the hub, fluid flowing in the leakage flow slot from a high pressure side to a low pressure side, wherein the seal abuts the bore with an endless substantially cylindrical surface.

3. The torque converter as recited in claim 2 wherein the hub includes a groove for receiving the seal.

4. The torque converter as recited in claim 2 wherein the substantially cylindrical surface of the seal is shorter in an axial direction, the axial direction being relative to a rotation axis of the torque converter.

5. The torque converter as recited in claim 2 wherein the cylindrical surface is confined by a bevel.

6. The torque converter as recited in claim 2 wherein the cylindrical surface is confined by a radius.

7. The torque converter as recited in claim 2 wherein the cylindrical surface is confined by a shoulder.

8. The torque converter as recited in claim 2 wherein a boundary of the seal faces an area with lower pressure.

9. The torque converter as recited in claim 8 wherein the boundary is one of a bevel, a radius or a shoulder.

10. The torque converter as recited in claim 9 wherein the seal has a bevel, radius, or shoulder at its interior diameter.

11. The torque converter as recited in claim 2 wherein a boundary of the seal faces an area with higher pressure.

12. The seal system as recited in claim 11 wherein the boundary is one of a bevel, a radius or a shoulder.

13. The torque converter as recited in claim 2 wherein the seal includes a first seal with the cylindrical outer surface and a second seal, the second seal radially preloading the first seal relative to a rotation axis of the torque converter.

14. The torque converter as recited in claim 13 wherein the first seal has a circumferential concave shape at an interior diameter.

15. The seal system as recited in claim 13 wherein the second seal is an O-ring.

16. The torque converter as recited in claim 2 wherein the seal includes a first seal with the cylindrical outer surface and a second seal, the second seal axially preloading the first seal relative to a rotation axis of the torque converter.

17. The torque converter as recited in claim 16 wherein the second seal is an O-ring.

* * * * *